United States Patent [19]

Thacker

[11] 4,103,331

[45] Jul. 25, 1978

[54] DATA PROCESSING DISPLAY SYSTEM

[75] Inventor: Charles P. Thacker, Palo Alto, Calif.

[73] Assignee: Xerox Corporation, Stamford, Conn.

[21] Appl. No.: 800,370

[22] Filed: May 25, 1977

Related U.S. Application Data

[63] Continuation-in-part of Ser. No. 733,552, Oct. 18, 1976, which is a continuation of Ser. No. 519,153, Oct. 29, 1974, abandoned.

[51] Int. Cl.[2] .................... G06F 3/14

[52] U.S. Cl. .................... 364/200; 340/324 AD

[58] Field of Search .................... 364/200, 900; 340/324 A, 324 AD, 324 M

[56] References Cited

U.S. PATENT DOCUMENTS

| | | | |
|---|---|---|---|
| 3,742,289 | 6/1973 | Koeljmans | 315/18 |
| 3,872,446 | 3/1975 | Chambers | 364/200 |
| 3,893,075 | 7/1975 | Orban et al. | 364/900 |
| 3,895,374 | 7/1975 | Williams | 340/324 AD |
| 3,906,480 | 9/1975 | Schwartz et al. | 340/324 AD |
| 3,952,297 | 4/1976 | Stauffer et al. | 340/324 A |
| 3,958,225 | 5/1976 | Turner | 340/324 A X |
| 3,973,245 | 8/1976 | Belser | 340/324 AD X |

*Primary Examiner*—Mark E. Nusbaum

*Attorney, Agent, or Firm*—Barry Paul Smith

[57] ABSTRACT

A data processing display system comprises a display device capable of displaying a desired image and including a plurality of points each capable of being selectively illuminated. A main memory storage device is also included in the system and comprises a plurality of addressable storage locations, each location capable of storing a multi-bit display word therein. At least some of the addressable storage locations include in the aggregate a number of bits at least equal to the plurality of points of the display device. A display bit map of the desired image is thus capable of being stored and defined in the at least some addressable storage locations.

7 Claims, 10 Drawing Figures

SYNC GENERATOR 196

DATA PROCESSING DISPLAY SYSTEM

CROSS-REFERENCE TO RELATED APPLICATION

This application is a continuation-in-part of copending U.S. application Ser. No. 733,552 filed on Oct. 18, 1976 as a continuation of now abandoned U.S. application Ser. No. 519,153 filed on Oct. 29, 1974 in the name of Charles P. Thacker and entitled MICROPROGRAMMABLE DISPLAY SYSTEM.

BACKGROUND OF THE INVENTION

This invention relates to data processing systems and more particularly, to data processing display systems including one or more display devices each capable of displaying a desired image.

Prior art processing display systems are characterized by special purpose memories which in the aggregate define a character generator. Typical display devices are of the raster-scanned type, such as CRT-TV tubes. A character to be formed at a location on the display screen is defined by a matrix of selectively energizable points arranged in a plurality of vertically oriented scan lines. As is conventional, a scanning beam scans from left to right, one scan line at a time, until an entire "page" is displayed, and then returns to the top scan line in order to "refresh" the image on the screen. Typically, the image is refreshed 30 times per second.

It is a characteristic of prior art systems that characters are definable only in fixed "blocks" on the display screen, each block containing the requisite matrix of energizable points. As is conventional, a display list memory contains the character data to be displayed in the form of a plurality of ASCII coded words each defining a particular character element. A predetermined number of words in the display list memory define each text line to be displayed. Each ASCII coded word from the display list memory is forwarded to a separate font memory along with a signal indicating a scan line number. For example, there may be eight scan lines in the matrix for each character which then could be 8 × 8. Thus, the scan line number signal could be a 3-bit code. The font memory contains a plurality of words each representing the desired bit configuration for each scan line of a particular character. It is the output of the font memory that is supplied to the display controller for transmittal in bit-serial format to the display device. The words of the font memory are traditionally supplied directly one at a time to the display controller. Other prior data processing display systems, such as that disclosed in U.S. Pat. No. 3,895,357, store a predetermined number of the font memory words, such predetermined number defining a small band of the picture to be displayed, into a partial raster assembly store. Again, however, special purpose memories are employed.

The main problem with these prior art "character generator" type display systems is that they are generally limited to forming characters only, and only on specifically predetermined portions or "blocks" of the display screen. They do not have a "graphics" capability, i.e. the ability to draw relatively high resolution lines and curves unrelated to the conventional alphanumeric characters. U.S. Pat. No. 3,716,842 discloses a data processing display systems that does have a graphics capability. However, the system is relatively complex from a hardware standpoint in requiring, again, special purpose memories.

It would be desirable, therefore, to provide a data processing display system having the attributes of simplicity and generality, i.e. simplicity in a hardware sense such as by avoiding special purpose memories, and generality in a display capability sense such as being virtually unlimited as to the nature and location of data displayed on the display thereby providing a graphics capability.

SUMMARY OF THE INVENTION

In furtherance of this desirability, a data processing display system in accordance with the present invention comprises a display device capable of displaying a desired image, said display device including a plurality of points each capable of being selectively illuminated; a main memory storage device including a plurality of addressable storage locations, each location capable of storing a multi-bit display word therein, at least some of said addressable storage locations including in the aggregate a number of display bits at least equal to said plurality of points of said display device whereby a display bit map of said desired image is capable of being stored and defined in said at least some addressable storage locations; a display controller connected to said display device and responsive to predetermined instructions for controlling the illumination of said plurality of points of said display device in accordance with said bit map stored in said main memory storage device; a central processing unit including means for supplying said predetermined instructions to said display controller, and means for addressing the storage locations of said main memory storage device; and a main data transfer bus connected to said main memory storage device, said central processing unit and said display controller, said main data transfer bus capable of transmitting the words stored in said at least some addressable storage locations of said main memory storage device to said display controller in order for said bit map to be displayed on said display device.

Since every single point capable of being illuminated on the display device has a corresponding bit location in the main memory storage device, the central processing unit can easily access and manipulate the display data in the same manner as with any other type of data normally stored in main memory. This feature embraces the data processing display system of the present invention with the desired attributes of simplicity and generality, as those terms have been defined above.

These and other aspects and advantages of the present invention will be more completely described below with reference to the accompanying drawings.

DESCRIPTION OF THE PREFERRED EMBODIMENT

Figure 1:
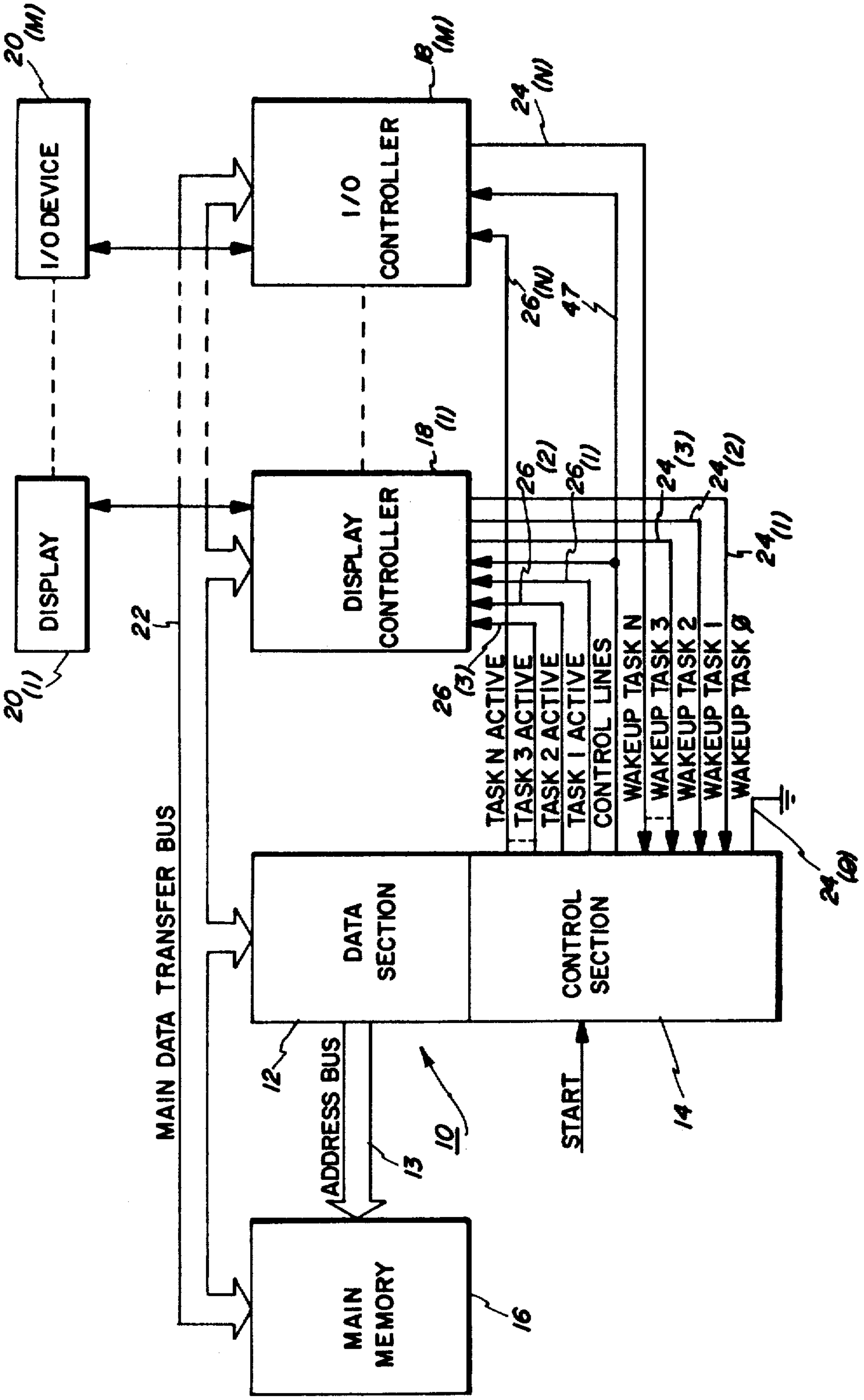
FIG. 1 is a block diagram representation of an exemplary data processing display system of the present invention.

Referring to FIG. 1, a data processing display system of the present invention is shown. The system includes a central processing unit (CPU) 10 that is comprised of a data section 12 and a control section 14. The system also includes a main memory 16 to be described below and a plurality of input-output (I/O) controllers 18, e.g., "M" I/O controllers designated $\mathbf{18}_{(1)}$ through $\mathbf{18}_{(M)}$. Each of the I/O controllers 18 is connected to a respective one of a plurality of I/O devices 20 for controlling same. At least one of the I/O controllers 18, e.g. controller $\mathbf{18}_{(1)}$, is a display controller for controlling a display device $\mathbf{20}_{(1)}$. Examples of other typical I/O devices that may be employed as I/O devices 20 in the system of FIG. 1 are disk drives, keyboards and cursor control devices (sometimes each referred to as a "mouse"). The depiction of only one display controller $\mathbf{18}_{(1)}$ and associated display device $\mathbf{20}_{(1)}$ is, of course, only exemplary.

Information is transferred to and from the data section 12 of the CPU 10 by means of a main data transfer bus 22. The information is desirably transferred in bit-parallel format. Typical CPU's are designed to operate in 8-bit or 16-bit format, i.e., 8-bit or 16-bit quantities are transferred to and from the data section 12 along the bus 22, which would then be comprised of either at least eight or at least sixteen parallel lines. Information may be transferred on the data bus 22 between the main memory 16 and the data section 12, between the I/O controllers 18 and the data section 12, as well as between each of the I/O controllers 18 and the main memory 16.

Each of the I/O controllers 18, including the display controller $\mathbf{18}_{(1)}$, is capable of generating one or more task request signals in the form of "wake-up" commands whenever the particular controller 18 requires one or more services to be performed by the CPU 10. The specific nature of three wakeup-task request signals that are preferably generated by the display controller $\mathbf{18}_{(1)}$ will be described in more detail below. The wake-up-task request signals from the controllers 18 are applied on respective lines $\mathbf{24}_{(1)}$-$\mathbf{24}_{(N)}$. The three wakeup-task requests from the display controller $\mathbf{18}_{(1)}$, arbitrarily designated wakeup-tasks 1-3, are applied on lines $\mathbf{24}_{(1)}$-$\mathbf{24}_{(3)}$ to the control section 14 of the CPU 10. In order for each controller 18 to be informed when the CPU 10 is executing instructions relating to the requested service, the control section 14 includes means to be described below for applying a "task-active" status signal back to the controller. These task-active status signals are applied on lines 26 from the control section 14 to the controllers 18, as shown in FIG. 1. There are three task-active lines associated with the display controller $\mathbf{18}_{(1)}$, i.e. task 1 active on line $\mathbf{26}_{(1)}$, task 2 active on line $\mathbf{26}_{(2)}$ and task 3 active on line $\mathbf{26}_{(3)}$.

Figure 2:
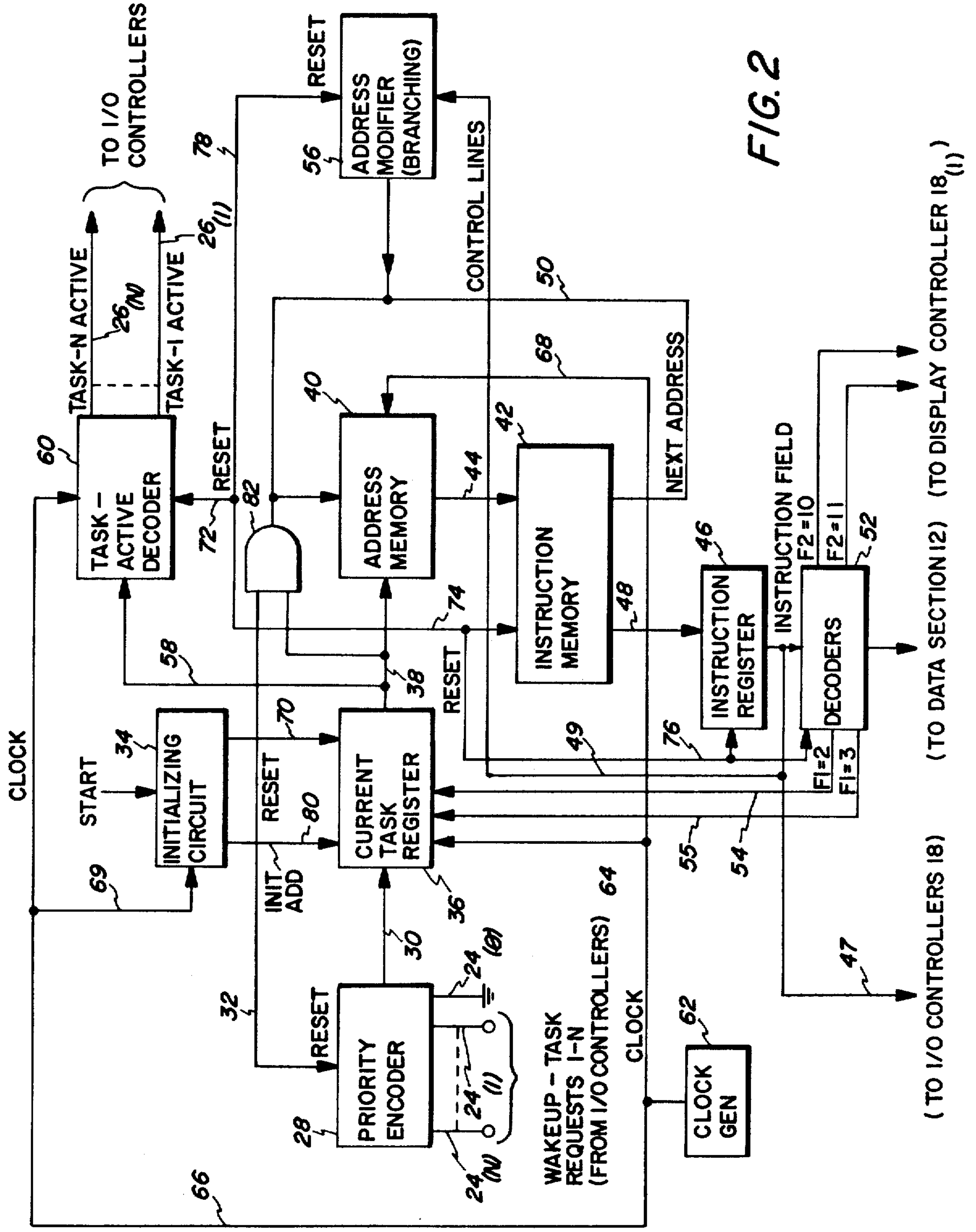
FIG. 2 is a schematic block diagram representation of the control section of the CPU depicted in FIG. 1.

Reference is now had to FIG. 2 where the control section 14 of the CPU 10 will be described. At the outset, it must be stated generally that the control section 14 applies instructions to the data section for execution thereby. Additionally instructions are applied to the various I/O controllers 18 for execution thereby. The instructions are forwarded in accordance with a particular sequence or routine to be carried out and identified with a particular task to be serviced. The control section 14 includes means to be described below for determining which of a plurality of wakeup-task request signals that may have been applied to the control section 14 has the highest current priority value. More specifically, each of the plurality of tasks to be serviced is preassigned a unique priority value. Thus, performing a requested service for the display controller $\mathbf{18}_{(1)}$ may be of higher priority than performing a requested service for I/O controller $\mathbf{18}_{(M)}$. The control section 14 then forwards instructions associated with the highest current task to be serviced to the data section 12 and respective I/O controller 18 for execution.

Referring now in more detail to FIG. 2, the control section 14 includes a priority encoder 28 which has task request inputs connected to the N task request lines 24. As explained above, wakeup-task request signals for task 1-N are provided from the I/O controllers 18. Additionally, a wakeup-task request signal for task 0, which requests servicing the main program, is always present, as will be explained in more detail below. The priority encoder 28 includes circuitry (not shown) for generating a multi-bit control signal on a respective plurality of lines 30 (only one shown) related to the highest priority wakeup-task request signal currently applied as an input to the encoder 28. The priority encoder 28 includes a further input for receiving a RESET signal on a line 32 from an initialize circuit 34 to be described in more detail below.

Now then, the control signal developed on lines 30 is applied to respective inputs of a current task register 36 which responds to such control signal for generating a multi-bit address signal that is applied in bit-parallel format on a respective plurality of lines 38 from the register 36 to respective inputs of an address memory 40. The address memory 40 includes a plurality of storage locations, preferably defined by a respective plurality of multi-bit registers (not shown). There are preferably N such registers included in the address memory 40, each one being addressed by a unique multi-bit code defined by the address signal applied thereto from the current-task register 36 on lines 38.

Each one of the N registers in the address memory 40 is associated with a respective one of the N tasks to be performed, as defined above. In actuality, each of the address memory registers is capable of storing the next address of an executable microinstruction stored in a microinstruction memory 42. In this respect, each of the N address memory registers may be thought of as a program counter for its respective task to be serviced relative to the corresponding microinstruction routine stored in the instruction memory 42.

Each instruction stored in the memory 42 is accessed in response to a corresponding address signal applied on address lines 44 from the address memory 40. Each instruction includes an instruction field preferably comprised of twenty-two bits, and a next-address field preferably comprised of ten bits. The specific constitution of the 22-bit instruction field will be described in more detail below in connection with FIG. 3. The instruction field is loaded into an instruction register 46 on lines 48 and is then applied through appropriate decoders 52 (also to be described in more detail below in connection with FIG. 3) to the data section 12 of the CPU. Certain of these decoded instructions are also forwarded to the display controller $18_{(1)}$, as will be discussed below in connection with FIGS. 3 and 4. The next-address field is fed back on lines 50 to the currently addressed register in the address memory 40. In this manner, each of the N registers in the memory 40 will always contain the address of the next microinstruction stored in the instruction memory 42 to be executed in accordance with the particular task to be serviced.

A portion of the twenty-two bit instruction field of each microinstruction may be dedicated to various special functions, some of which are applied on control lines 47 to respective ones of the I/O controllers 18 for controlling same, and some of which are applied on control lines 49 to address modifier circuits 56 (to be described below) for branching. In accordance with the preferred embodiment, there is a four-bit special function "sub-field" in the instruction field of each microinstruction (hereinafter referred to as the "F1" sub-field), wherein two of the 16 four-bit codes capable of being defined (e.g. F1=2, F1=3) are respectively representative of "TASK" and "BLOCK" functions. A TASK signal component of an accessed instruction, upon being decoded by an appropriate one of the decoders 52, is applied on a line 54 to the current task register register 36 for enabling same to load an address signal, representing the current highest priority task requesting service. This address signal is then applied to the address memory 40. A decoded BLOCK signal is applied on a line 55 to the current task register 36 for disabling same.

It will be appreciated that a TASK signal can be presented in any desired microinstruction during any routine to be executed. Normally, a TASK signal would be generated at least once during each microinstruction routine in order to enable any higher priority task awaiting service to interrupt the current routine in order to be serviced by the CPU 10. If a particular task to be serviced has a microinstruction routine that carries out a plurality of different functions that can be independently serviced, then a TASK signal would normally be written into the last microinstruction of each segment of the routine identified with a particular one of such functions.

Continuing with a description of FIG. 2, the control section 14 of the CPU 10 further includes conventional address modifier circuits 56 which, in a known manner, are responsive to instructions on control lines 49 for modifying the next-address signal being fed back on lines 50 from the instruction memory 42 to the address memory 40. As is conventional, such address modifiers are used for branching. The specific nature of the address modifier 56 forms no part of the present invention and thus shall not be described in detail.

The multi-bit address signal developed at the output of the current task register 36, in addition to being applied to the address memory 40 on lines 38, is also applied on lines 58 to a task-active decoder 60. The decoder 60 responds to the address signal output of the register 36 and generates one of the N TASK-ACTIVE signals alluded to earlier on its respective line 26, dependent upon the current highest priority task to be serviced. The decoder 60 includes a delay circuit for delaying the application of a TASK-ACTIVE signal to the respective I/O controller 18 by one clock cycle of the processor. In this manner, the appropriate TASK-ACTIVE signal will be generated at a time corresponding to the execution of instructions related to the task being serviced.

The control section 14 as shown in FIG. 2 also includes a clock generator 62 for generating appropriate CLOCK signals for application to the current-task register 36 on a line 64, the task-active decoder 60 on a line 66, the address memory 40 on a line 68, and the initialization circuit 34 on a line 69.

Still referring to FIG. 2, the initialization circuit 34 is responsive to a START signal generated when the system is turned on by the operator. Upon receipt of the START signal, conventional circuitry in the circuit 34 causes a RESET signal to be generated which is applied to the priority encoder 28 on line 32, to the current task register 36 on a line 70, to the task-active decoder 60 on a line 72, to the instruction memory 42 on a line 74, to the instruction register 46 and decoders 52 on a line 76, and to the address modifier 56 on a line 78. Upon receipt of a RESET signal, these various components of the control section 14 are reset.

The initialization circuit 14, in response to a START signal, also generates a multi-bit initialization address signal on a respective plurality of lines 80. In a preferred embodiment of the invention, "N" equals 16 and thus the initialization address signal is a four-bit signal that is initially zero, i.e., 0000, and is incremented by one at the rate of the CLOCK signal pulses applied on line 69. The RESET signal is maintained for sixteen cycles, i.e. sixteen CLOCK signal pulses, at which time the initialization address on lines 80 will increment from zero (0000) to fifteen (1111). As will be described below, the address signal output of the current task register 36 during initialization is identical to the initialization address signal. During initialization, the address signal output of the current task register 36 is applied through an AND-gate 82, which is enabled by a RESET signal from the initialization circuit 34, to the address memory 40. In this manner, the address signal (0000) will be loaded into register number zero in the address memory 40, the address signal one (0000) into register number one, and so on. This process initializes the address memory by setting the various registers therein at their respective starting values.

Further details of the control section 14 of the CPU 10 may be had through a review of copending U.S. application Ser. No. 769,254 filed on Feb. 16, 1977 as a continuation of now abandoned U.S. application Ser. No. 518,679 filed on Oct. 29, 1974 by Charles P. Thacker for TASK HANDLING IN A MICRO-PROGRAMMED DEVICE and assigned to the assignee of the present invention, both such applications being hereby incorporated by reference.

Figure 4:
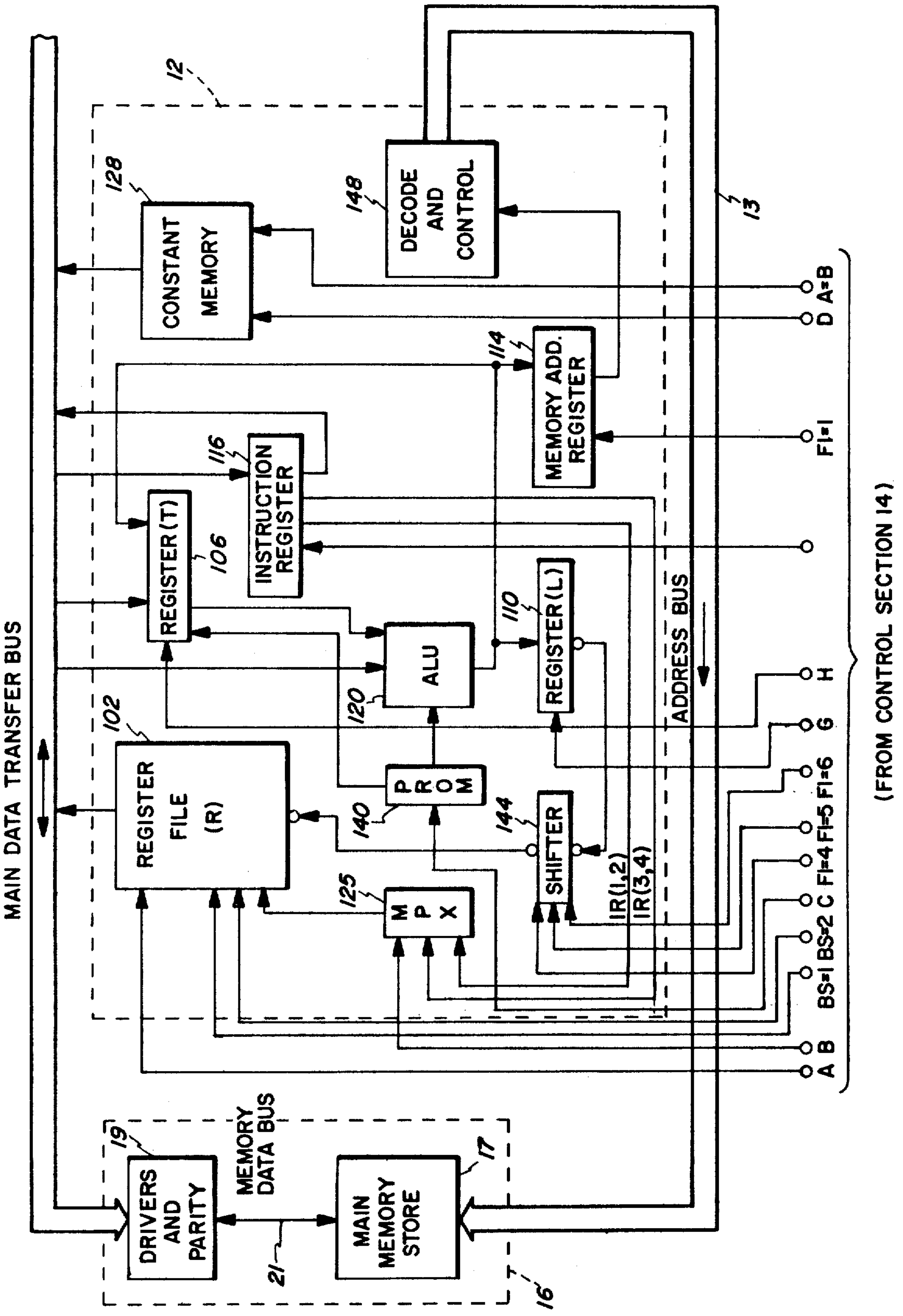
FIG. 4 is a schematic block diagram representation of the data section of the CPU and the main memory depicted in FIG. 1.

Referring now to FIG. 4, the basic elements of the data section 12 of the CPU 10 are a register file 102, T register 106, L register 110, memory address register (MAR) 114, and instruction register 116. The registers 106, 110, 114 and 116 are connected to the register file 102 and to an arithmetic and logic unit (ALU) 120 by means of the main data transfer bus 22, which is desirably 16 bits in width.

Data is typically put onto the bus 22 from the register file 102 which is preferably implemented by a group of 32 registers whose contents are read or loaded as selected by a specific microinstruction field. Data may also be entered on the bus 22 from a constant memory 128 which is preferably implemented by any commercially available 256-word read only memory (ROM) which holds arbitrary 16-bit constants. Data may be available as well from the I/O devices 20, such as the display $\mathbf{20}_{(1)}$. Other data is available from the main memory 16 and portions of instructions are entered on the bus 22 from the instruction register 116. The main memory 16 will be described in more detail below.

Data may be transferred from the bus 22 to the I/O controllers 18, the main memory 16, the instruction register 116, the T register 106, or even the L register 110 through the ALU 120. Data transfers are under the control of microinstructions which are executed from the instruction memory 42, which is desirably implemented by a conventional 1024 word × 32-bit programmable read-only-memory (PROM).

Figure 3:
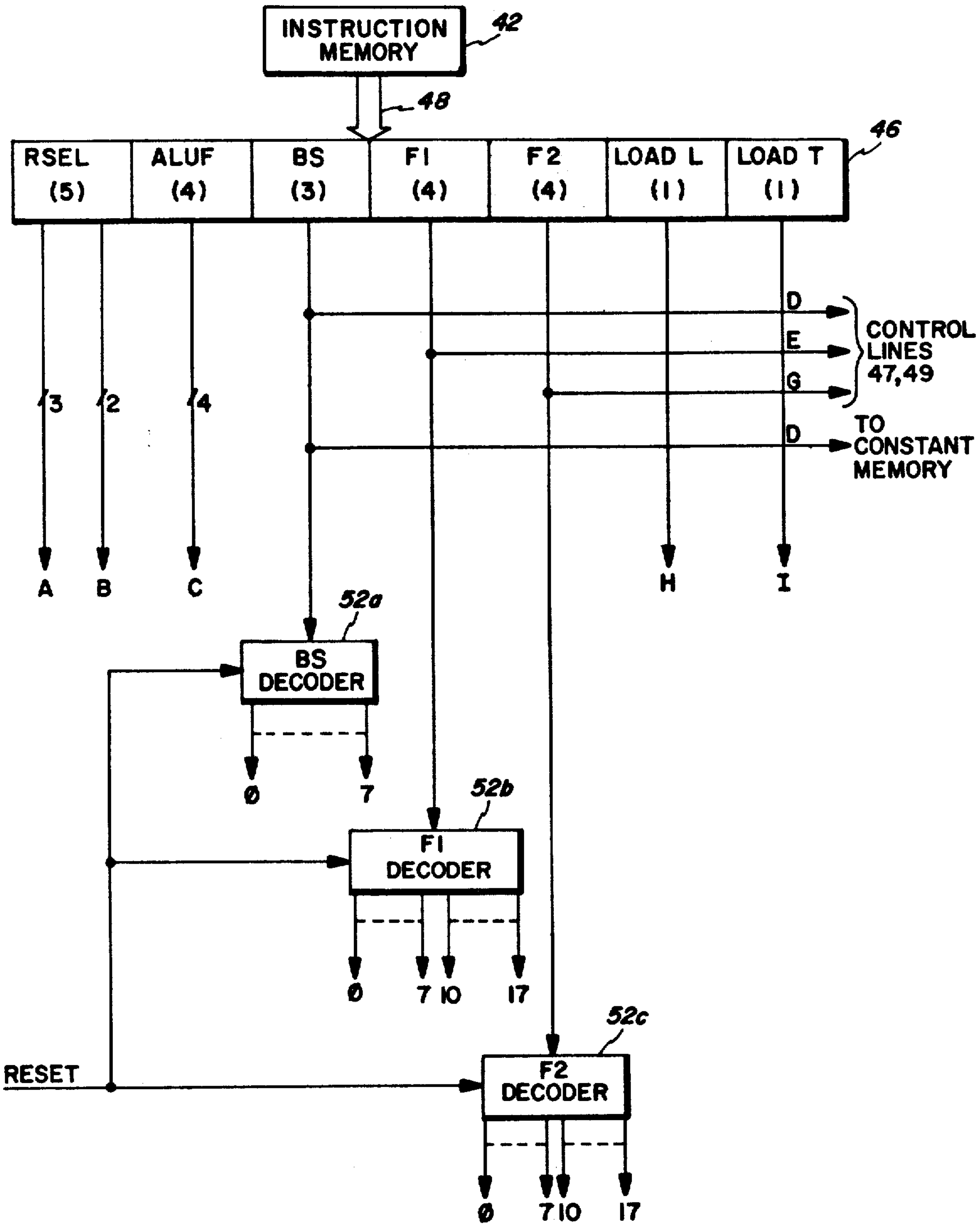
FIG. 3 is a more detailed block diagram representation of the instruction register and decoders depicted in FIG. 2.

The specific nature of the 22-bit instruction field of a 32-bit microinstruction accessed from the instruction memory 42 will now be described with reference to FIG. 3. As shown, the 22-bit instruction field loaded into the instruction register 46 includes seven "sub-fields" as follows:

| BIT(S) | SIGNAL | MEANING |
|---|---|---|
| 0–2 | A | REGISTER (R) SELECT |
| 3,4 | B | REGISTER (R) SELECT |
| 5–8 | C | ALU FUNCTION |
| 9–11 | D | BUS DATA SOURCE |
| 12–15 | E | FUNCTION 1 |
| 16–19 | G | FUNCTION 2 |
| 20 | H | LOAD L |
| 21 | I | LOAD T |

The R Select field (bits 0–4, signals A and B) specifies one of the 32 registers which comprise the register file 102 to be loaded or read under control of the bus source field, or, in conjunction with the bus source field (bits 9–11, signal D), one of the 256 locations to be read from the constant memory 128. The low order two bits of the R address (but not the constant memory address) may be taken from fields in the instruction register 116, i.e. IR (1,2) and/or IR (3,4), as applied through a conventional multiplexer 125 (FIG. 4). This enables the main microgrogram, i.e. task 0, to address certain registers in the R file 102 more easily.

The ALU Function field controls the ALU 120. The ALU 120 can do a total of 48 arithmetic and logical operations. The 4-bit field is mapped by a PROM 140 into the 16 most useful functions. These functions are disclosed and described in detail in the aforementioned parent applications Ser. Nos. 519; 153 and 733,552, both of which are hereby incorporated by reference.

The bus data source field (bits 9–11, signal D), upon being decoded by BS decoder **52*a*, specifies one of eight data sources for the bus 22** as follows:

| OUTPUT BS DECODER 52a | SOURCE OF DATA |
|---|---|
| 0 | Read R Register 102 |
| 1 | Load R Register 102 |
| 2 | Nothing (−1) |
| 3 | Kstat (assigned to disk controller if used as one of controllers 18) |
| 4 | Kdata (assigned to disk controller if used as one of controllers 18) |
| 5 | Memory data (from main memory 16) |
| 6 | Input device data (4 bits, remainder of word is 1) : MOUSE (if used as one of controllers 18) |
| 7 | Disp (low order 8 bits of instruction register 116, sign extended) |

Output 1, i.e. Load R, is not logically a source, but since the register file (R) 102 is gated to the bus 22 during both reading and writing, it is included in the source specifiers.

The two function fields F1 and F2 specify the address modifiers, register load signals (other than those for the registers 102, 106 and 110) and other special conditions required. The first eight conditions specified by each field after being decoded by F1 decoder **52*b*** are interpretated identically by all tasks, but the interpretation of the second eight decoded conditions depends on the active task. The first eight task-independent functions are given below, whereas the latter eight task-dependent (also referred to as "task-specific") functions will be described later.

| OUTPUT F1 DECODER 52b | NAME | MEANING |
|---|---|---|
| 0 | — | No activity |
| 1 | MAR← | Load MAR 114 from ALU 120 output; start main memory 16 reference |
| 2 | TASK | Switch tasks if higher priority wakeup pending |
| 3 | BLOCK | Disable current task wakeup until reenabled by hardware generated condition |
| 4 | ←L lsh 1 | Left shift L (one place) |
| 5 | ←L rsh 1 | Right shift L (one place) |
| 6 | ←L lcy 8 | Cycle L (8 places) |
| 7 | ←CONSTANT | BUS constant ROM location addressed by R SELECT BUS SOURCE |

Outputs 4–6 are modified by function fields F2=11 and F2=12, such fields to be described in detail later.

| OUTPUT F2 DECODER 52c | NAME | MEANING |
|---|---|---|
| 0 | — | No Acitivity |
| 1 | BUS=0 | NEXT←NEXT OR(BUS=0) |
| 2 | SH 0 | NEXT←NEXT OR (SHIFTER OUTPUT 0) |
| 3 | SH=0 | NEXT←NEXT OR (SHIFTER OUTPUT=0) |
| 4 | BUS | NEXT←NEXT OR BUS (06) −BUS (15) |
| 5 | ALUCY | NEXT←NEXT OR LALUCO (THE CARRY USED IS THAT PRODUCED BY THE ALU FUNCTION WHICH LAST LOADED THE L REGISTER 110. |
| 6 | STORE | |
| 7 | CONSTANT | SAME AS F1=7 |

The ALU 120 is restricted by the mapping of its 4-bit field by the PROM 140 so that only 16 arithmetic and logical functions may be performed. The output of the ALU 120 is transferred to the L and memory address registers 110 and 114. The T register 106 may also be loaded from the output of the ALU 120 under certain conditions. The L register 110 is connected to a shifter 144 which is capable of left and right shifts by one place, and cycles of eight. Double-length shifts may also be formed. The output of the shifter 144 is transferable to the register file 102. The output of the MAR register 114 is decoded by a decode and control unit 148 and transferred along the address bus 13 to the main memory 16, and more particularly to a main memory store 17 of the main memory 16. Details of the main memory 16 and its main memory store 17 will be described below.

As indicated above, microinstructions are executed one at a time in each processing cycle. Generally speaking, with respect to the data section 12 of the CPU 10, a microinstruction consists of taking a piece of data from a source register in the register file 102, operating upon it, and loading the results into another register. For example, a microinstruction may dictate that the contents of the 23rd register in the register file 102 be transferred by way of the bus 22 to the T register 106. This microinstruction would be in the form of having the R select field equalling 23 and having the load T bit set. An additional operation may take as many as three microinstructions. If it is desired to add the contents of the 22nd register of the register file 102 with the 23rd register and transfer the results to the 30th register, three microinstructions are, in fact, necessary. The first microinstruction would read the contents of the 22nd register into the T register 106; the second microinstruction would read the contents of the 23rd register through the ALU 120 and into the L register 110 and simultaneously would define an addition operation in the ALU function field so that the ALU 120 would perform addition (the result stored in the L register 110 at the end of the second microinstruction would thus be the sum of the contents of the 22nd register and the contents of the 23rd register); the third microinstruction would transfer the contents of the L register 110 through the shifter 144 back into the appropriate destination in the register file 102.

The microinstruction is structured so that a parallelism of different operations may be directed by a given instruction. This segmentation is achieved by the definition of specific fields within the instruction as is represented in FIG. 3. A given instruction is selected from the instruction memory 42 and is transferred to the microinstruction register 46 where it is stored as shown in FIG. 2. In the preferred embodiment of the invention and as indicated above, seven fields comprising an instruction width of 22 bits dictate the processing operations to be performed. Five bits (signals A and B) are used to select the location in the register file 102 which are to be involved during a given instruction period. If the register file 2 is not to be involved within a particular processing cycle, this RSELECT (RSEL) field has a value of zero. A 4-bit arithmetic and logic unit function field ALUF (signal C) specifies one of 16 logical operations, including addition and subtraction, which the ALU 120 can perform. A 3-bit bus source field BS (signal D) determines which of the previously identified eight possible data sources are gated onto the 16-bit bus 22 during the particular microinstruction period.

The Read R and Load R bus sources are typically used in almost every microinstruction. With the value of two, the BS field specifies that nothing is to be placed on the bus 22. The Kstat source indicates status bits which would be stored within a disc controller, if used as one of the I/O controllers 18. Kdata would consider 16 bits of disc data as a source, again assuming a disc controller were being utilized in the system. Memory data identifies data which would result from a fetch from a particular location in the main memory store 17. The indicator device data could possibly be represented by four external control bits. Disp would be the lower 8 bits of of the instruction register 116, with bits 0–7 made equal to bit 8 (sign extension). This particular bus source specification allows for the definition of microcode which provides fast processing. As has been already mentioned, the register file 102 is gated to the bus 22 during both the reading and the writing of the file 102. Thus, Load R source is included in the source specifiers.

Whenever the register file 102 is selected for reading or writing, data is necessarily placed on the bus 22. Therefore, the bus 22 contains data whenever a write operation is performed on the files 102, even though some other transfer in parallel may be made. Writing into the file 102, then, uses the Load R condition in the BS field. If writing into the file 102 is not specified with this field, then there would be no other use for this field during that microinstruction. With this implementation, during an instruction which writes data into the register file 102, the contents of the bus 22 will be represented as zero at that time, even though data was originally on the bus 22. This latter condition is implemented by the address memory 40 (FIG. 2) whose inputs are connected to the instruction register 116 and the bus 22 under the control of the signal ZERO BUS. The bus 22 is zero when the ZERO BUS signal is true, which signal is generated whenever the microinstruction specifies that the register file 102 be loaded.

The advantages of using special function fields F1 and F2 can be illustrated by the function of loading the memory address register (MAR) 114. This is a function that is performed moderately often in a microprogram, conceivably every five microinstructions. This frequency of use is not such that it would justify a special bit in the instruction, but often enough so that it should be specified as a task-independent function. Therefore, Load MAR is in the first set of eight function F1's, i.e. F1=1. Similar rational is applied to the implementation of the remaining functions within the set of functions.

The left shift (F1=4), right shift (F1=5) and cycle (F1=6) functions control the shifter 144 which is responsive to the output of the L register 110. Sixteen bits of data are transferred from the L register 110 to the shifter 144 in parallel and 16 bits which are inputted to the shifter 144 can be left shifted, right shifted, or cycled by 8 with the result of the operation being transferred to the register file 102 to be stored. By the use of the function F1, values 4, 5, or 6, these task independent functions may be specified.

Tasks may be switched to higher priority wake-up requests by the use of the function 1, value 2 (F1=2). Current task wake-up may be disabled by the use of the function 1, value 3 (F1=3). The function 1, value 7 instructs that a literal constant be fetched from the constant memory 128. There are preferably up to 256 literal constants stored in the constant memory 128, the addressing of which requires 8 bits. The constant memory

128, in the preferred embodiment, may be implemented by a 256×16 PROM available from Microsystems International, type MD6300. The constant memory 128 is gated to the bus 22 by F1 = 7, F2 = 7 or BS ≧ 4 fields. The constant memory 128 is addressed by the 8-bit concatenation of RSELECT and BS, as shown in FIG. 4. The intent in enabling constants with BS ≧ 4 is to provide a masking facility, particularly for the input device signal MOUSE and DISP bus source. This is facilitated because the processor bus 22 is arranged electrically such that it "ANDS" if more than one source is gated to it.

Up to 32 such mask constants can be provided for each of the four bus sources ≧ 4. For example, specific locations in memory are identified by constants representing their address to enable the microcode to communicate with the main program. Also, these constants may be used to implement masks, patterns and bits that the program wishes to contain. Otherwise, such features would have to be stored in the instruction memory 42 which would require an extra 16-bit field.

During an instruction, the constant memory 128 appears to be any other register in relation to the bus 22. The gating of the constant memory 128 onto the bus 22 can occur simultaneously with the specification of another function by the other function field which does not enable the gating of the constant to the bus 22. If, for example, the rest of the instructions dictate that the F2 field be used for a branch, then the assembler will assign F1=7. Otherwise, it will assign F2=7.

The function 2's are normally branch conditions. Each of the F2 values specify the condition that must be satisfied for branches to occur. Specifically, the notation NEXT indicates the next address bus 50 (FIG. 2), which transfers the address of the next microinstruction. The left arrow (←) means "gets". Therefore, F2=1 indicates that NEXT gets NEXT or (bus equals 0). This indicates that a branch will occur if the bus 50 equals 0, or the output of the shifter 144 is less than 0 or equal to 0, or will branch to the location specified by the bus 50. An address when generated allows a jump to the location addressed in the instruction memory 42 or a branch if the ALU 120 produces a carry out on the last operation from which it was used.

F2=6 provides for a STORE which says that the data that is currently on the bus 22 be written into the main memory store 17 during this microinstruction cycle. Since the main memory store 17 is much slower than the cycling of the processor itself, it takes four cycles before a STORE is performed. In the first cycle, the address register 114 is loaded, on the next two cycles, operations may be performed elsewhere in the processor, and in the fourth cycle, data is actually stored in the main memory store 17.

Task dependent (specific) functions are provided by function values in the F1 and F2 fields which are greater than 7, i.e. between 10 and 17. The following table gives for each of tasks 0, 1, 2 and 3 a number in the priority scheme and their specific functions. The remaining tasks 4-N are not set forth herein since they form no part of the present invention. Details of these tasks, however, if desired, may be obtained through a review of parent applications Ser. Nos. 519,153 and 733,552.

F1 (TASK SPECIFIC)

-continued

| CPU-0 | DWT-1 | DHT-2 | DVT-3 |
|---|---|---|---|
| 10: SWMODE | — | — | — |
| 11: WRTRAM | — | — | — |
| 12: RDRAM | — | — | — |
| 13: — | — | — | — |
| 14: — | — | — | — |
| 15: — | — | — | — |
| 16: — | — | — | — |
| 17: START | — | — | — |

F2 (TASK SPECIFIC)

| CPU-0 | DWT-1 | DHT-2 | DVT-3 |
|---|---|---|---|
| 10: BUSODD | DDR← | EVENFIELD | EVENFIELD |
| 11: MAGIC | — | SETMODE | — |
| 12: DNS | — | — | — |
| 13: ACEST | — | — | — |
| 14: IR | — | — | — |
| 15: IPISP | — | — | — |
| 16: ACSOURCE | — | — | — |
| 17: — | — | — | — |

As discussed above, task 0 is the main microprogram and always is requesting service. Tasks 1-3 are generated by the display controller 18$_{(1)}$. Task 1 is a display word task (DWT), task 2 a display horizontal task (DHT), and task 3 a display vertical task (DVT). As shown in the above tables, only task 0 has task-specific (dependent) function F1 values, i.e. F1 = 10, 11, 12 and 17. In the case of function F2, however, F2 = 10 - 16 designate functions for task 0, F2 = 10 designates a function (DDR←) for task 1, F2 = 10, 11 designate functions (EVENFIELD, SETMORE) for task 2, and F2 = 10 designates a function (EVENFIELD) for task 3. Specific details of the main microprogram, task 0, may be had from a review of Appendix B (See file of subject Application) hereto, as well as the above-referenced parent applications Ser. Nos. 519, 153 and 733,552. The three microcoded tasks 1-3 will be described below with reference to the display controller 18$_{(1)}$ and display 20$_{(1)}$, and further more specific details thereof may be had from a review of Appendix B hereto and parent applications Ser. Nos. 519, 153 and 733,552.

The display controller 18$_{(1)}$ handles transfers between the main memory 16 and the display 20$_{(1)}$. The display 20$_{(1)}$ may be a standard 875 line raster-scanned CRT-TV monitor, refreshed at 60 fields per second (30 "pages" per second) from a "bit map" in main memory 16. More specifically, there are interlaced even and odd fields, each refreshed 60 times per second so that the total page display is refreshed 30 times per second. The display 20$_{(1)}$ preferably contains 606 points horizontally and 808 points vertically, or 489,648 points total. Thirty-eight, 16-bit words are required to represent each scan line and 30,704 words are required to fill the screen. The bit map in main memory contains a total number of bits at least equal to 489,648, i.e. the total number of points on the display. This is an important feature of the present invention as will be made clear below.

A page to be displayed is defined at one or more display control blocks (DCB's) in the main memory store 17. DCB's are linked together starting at location DASTART in the main memory store 17 (see FIG. 5). Location DASTART points to the first DCB word 0, or 0 if the display 20$_{(1)}$ is off. All DCB's must start on even word boundaries. Location DASTART+1 represents a vertical field interrupt bit mask. Each DCB has the following format:

| | | |
|---|---|---|
| DCB word 0: | Pointer to next DCB, or 0 if this is the last. | |
| DCB word 1: | Bit 0 | 0=high resolution mode 1=low resolution mode |
| | Bit 1 | 0=black on white background presentation 1=white on black background |
| | Bits 2-7: HTAB: | On each scan line of this block, wait HTAB 16 bits before displaying information from memory. |
| | Bits 8-16: NWRDS: | Each scan line in this block is defined by NWRDS 16 bit words. (NWRDS must be even). |
| DCB word 2: | SA: | Bit map "starting address" (this address must be even). |
| DCB word 3: | SLC: | This block defines 2 × SLC scan lines, SLC in each field. |

At the start of each even and odd field, the display controller $18_{(1)}$ inspects DASTART and DASTART+1. An interrupt is initiated on the channel specified by the bits in DASTART+1. The controller $18_{(1)}$ then executes each DCB sequentially until the display list or the field ends. At normal resolution, the first scan line of the first (even) field of a block is taken from location SA to (SA) (NWRDS-1). During each field, the bit map address is incremented by NWRDS between each scan line. Thus, although the display is interlaced, its representation in memory is not. In low resolution mode, the video is generated at half speed, and each scan line is displayed twice (once in each field). During each field, the bit map address is not incremented between the display of adjacent scan lines. This makes the format of the bit map of the main memory store 17 identical for both modes—only the size of the presentation is affected by the mode. The storage of display data in the main memory store 17 will be described in more detail below with reference to FIG. 5.

Figure 6:
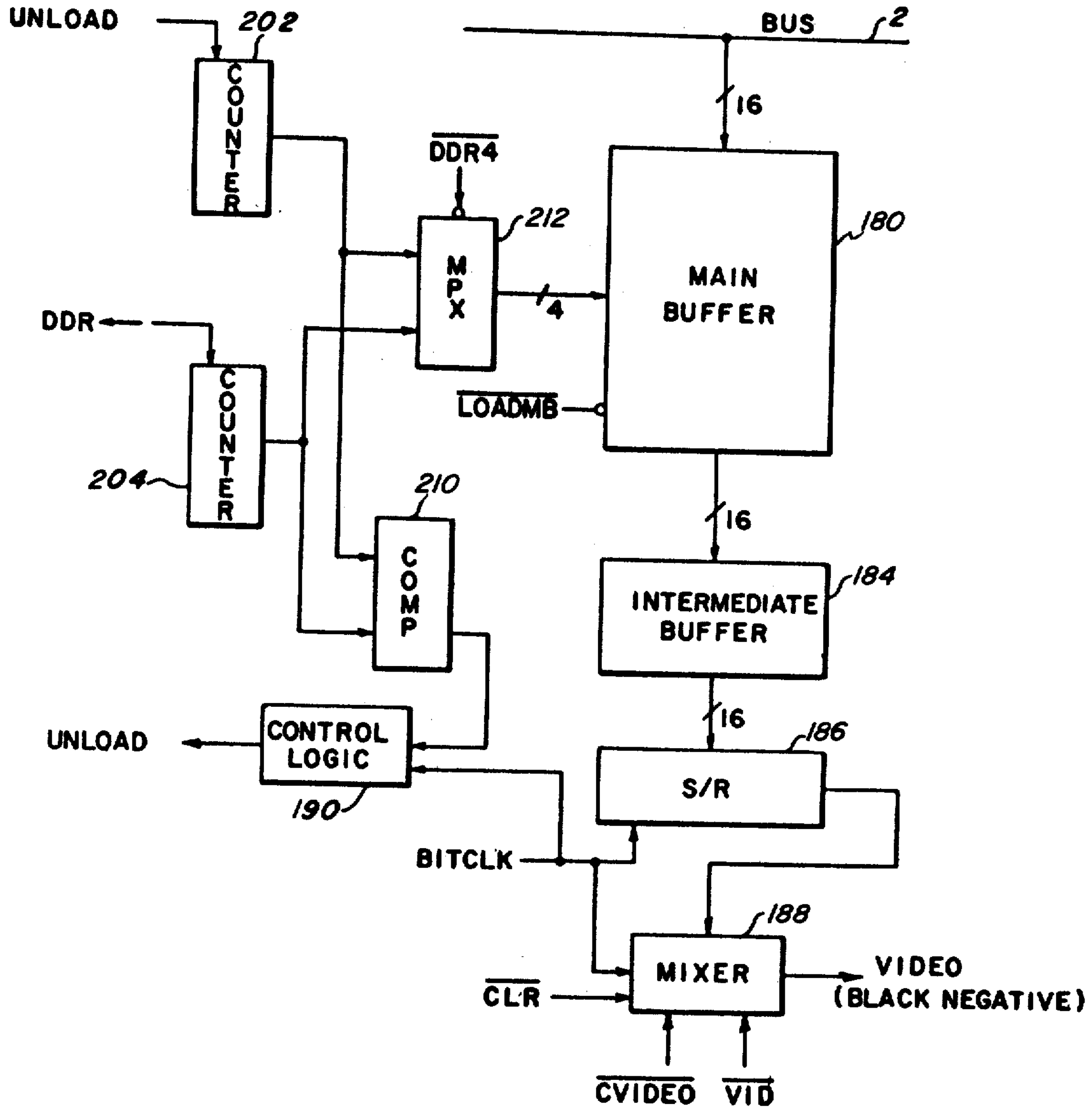
FIG. 6 is a block diagram representation of a portion of the display controller depicted in FIG. 1.
Figure 7:
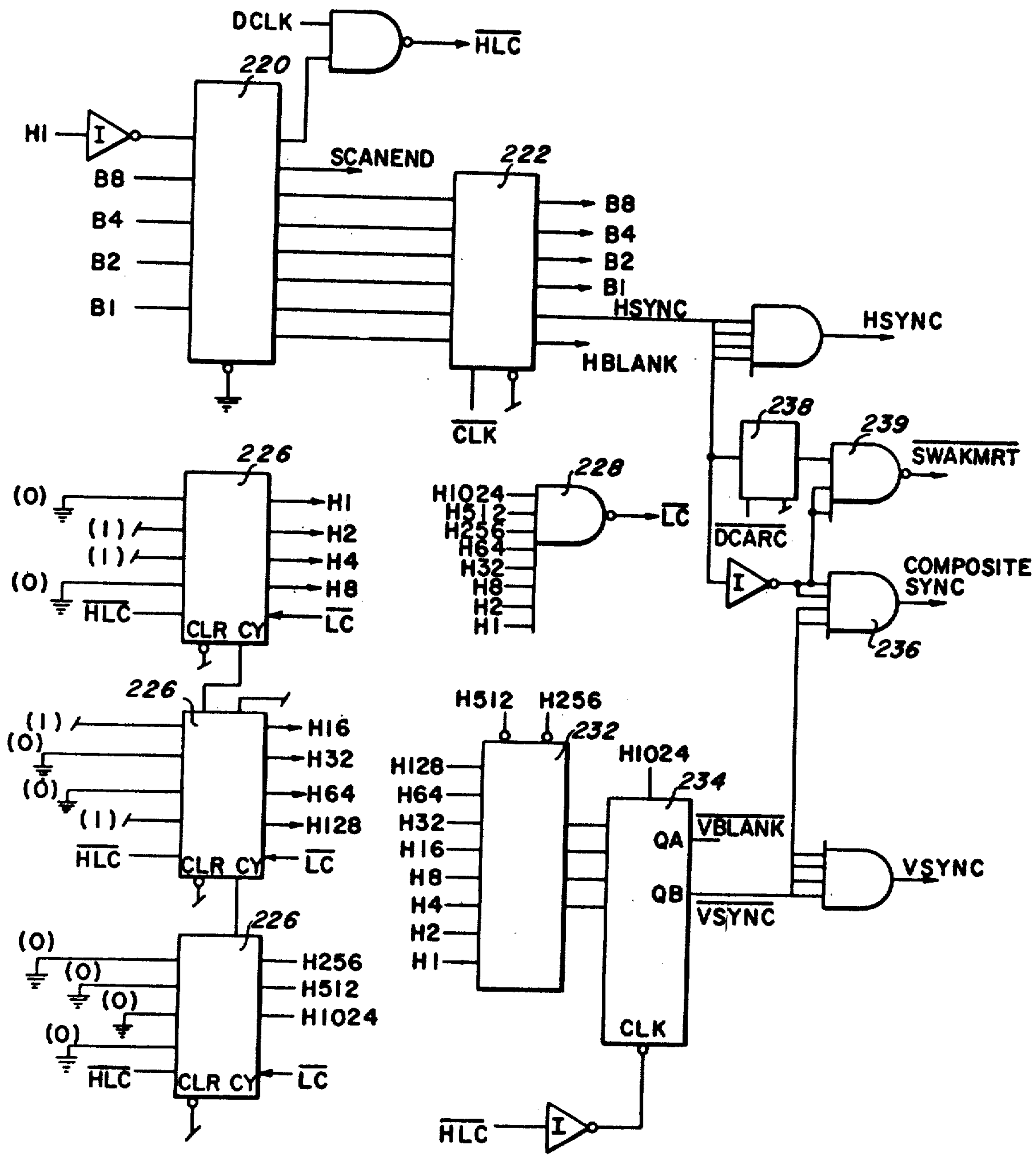
FIG. 7 is a block diagram representation of another portion of the display controller depicted in FIG. 1.

The display controller $18_{(1)}$ basically consists of a main buffer 180, intermediate buffer 184 and serializing shift register 186 (all shown in FIG. 6), a sync generator 196 (FIG. 7), and, as indicated above, the three microcode tasks 1-3, i.e. DWT, DHT and DVT, which control data handling and communicate with the main program. Referring to FIGS. 6 and 7, the 16 word buffer 180 is loaded from the bus 22 with the DDR←function (F2=10, specific to the display word task DWT). The purpose of the intermediate data buffer 184 is to synchronize data transfers between the main buffer 180, which is synchronous with a 170ns master clock, and the shift register 186, which is clocked with an asynchronous bit clock. The sync generator 196 provides the asynchronous bit clock and the vertical and horizontal synchronization signals required by the display $20_{(1)}$, as shown in FIG. 7.

The horizontal synchronization signal HSYNC is generated from timing and state information presented at the output of a programmable read-only memory 220 which receives at its input the signals B1, B2, B4, B8 and $\overline{\text{HI}}$. The output signals from the PROM 220 are latched in a latch 222, which provides the synchronization signal HSYNC along with HBLANK and the B field. The PROM 220 is preferably of the type 8223 by Signetics and the latch 222 is preferably of the type 74174 by Texas Instruments. The vertical synchronization signal VSYNC is generated in a remaining portion of the logic constituting the sync generator 196. A clock signal $\overline{\text{HLC}}$ is generated from the ANDing from one of the output signals from the PROM 220 with a clock signal DCLK in order to provide a clock signal to a half-line counter 226 comprised of counter elements, preferably type 9316 by Fairchild. The input to the counter 226 is a hard-wired octal number which determines the number of scan lines for the display $20_{(1)}$. The half-line counter 226 counts to the limit provided by the signal $\overline{\text{LC}}$ which is generated from a NAND gate 228 which decodes its input provided by the output of the counter 226 to the signal $\overline{\text{LC}}$. A PROM 232 processes the output of the counter 226 to generate input signals to a multiplexer 234 which generates the signals $\overline{\text{VBLANK}}$ and the vertical synchronication signal $\overline{\text{VSYNC}}$. The PROM 232 is preferably of the type MD 6300 by Microsystems International and the multiplexer 134 is desirably of the type 74298 by Texas Instruments.

The horizontal synchronization signal HSYNC is inverted by an inverter 237 and then the synchronization signals $\overline{\text{HSYNC}}$ and $\overline{\text{VSYNC}}$ are ORed by virtue of their respective signal levels by a NAND gate 236 to provide a composite synchronization signal. A latch 238 and a NAND gate 239 provide for the signal $\overline{\text{SWAKMRT}}$ which may be used in the event a "MOUSE" cursor device is used as one of the I/O devices 20.

Figure 8:
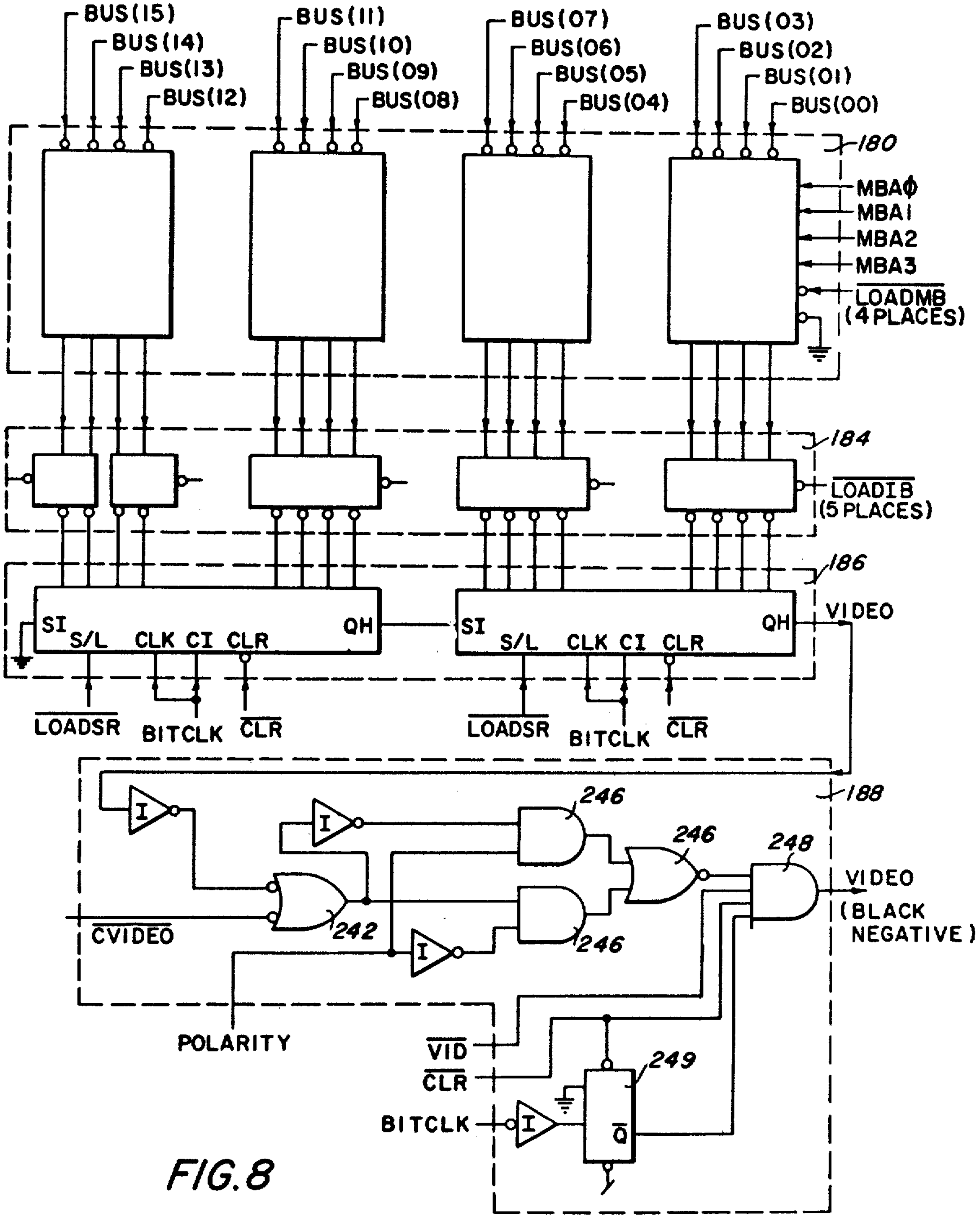
FIG. 8 is a schematic drawing of logic elements which constitute portions of the display controller as shown in FIG. 6.

In FIG. 8, the field BUS(0)-BUS(15) from the bus 22 is shown loaded into the main buffer 80 under control of the signal LOADMB. The signals MBA0-MBA3 select the word to be loaded from the bus 22. The main buffer 180 is comprised of four memory elements, preferably type 3101A by Intel. The output of the main buffer 180 is loaded into the intermediate buffer 184 under control of the signal $\overline{\text{LOADIB}}$. The buffer 184 is implemented by latches, desirably type 3404 by Intel.

Under control of the signal $\overline{\text{LOADSR}}$, the shift register 186 is loaded by the output of the intermediate buffer 184. The contents of the shift register 186 are clocked serially from the register 186 by means of the clocking signal BITCLK. The shift register 186 is implemented by two 8-bit shift register elements, preferably type 74166 by Texas Instruments. The output of the shift register 186 provides the video signal which is processed through the video mixer 188 to the display $20_{(1)}$. The video mixer 188 is implemented by a NOR gate 242 which "ORs" a curser video signal $\overline{\text{CVIDEO}}$ (assuming a cursor unit is employed in the system) with the video signal VIDEO. The output of the NOR gate 242 is further processed by an exclusive OR gate 246, comprised of a pair of AND-gates and a NOR-gate, all numbered 246, in order to provide the true VIDEO signal. A NAND gate 248 allows an external video signal VID to be provided the display $20_{(1)}$. Horizontal blanking of the VIDEO signal is provided by the signals $\overline{\text{CLR}}$ and the output of a flip-flop 249 under control of the signals $\overline{\text{CLR}}$ and BITCLK.

Figure 9:
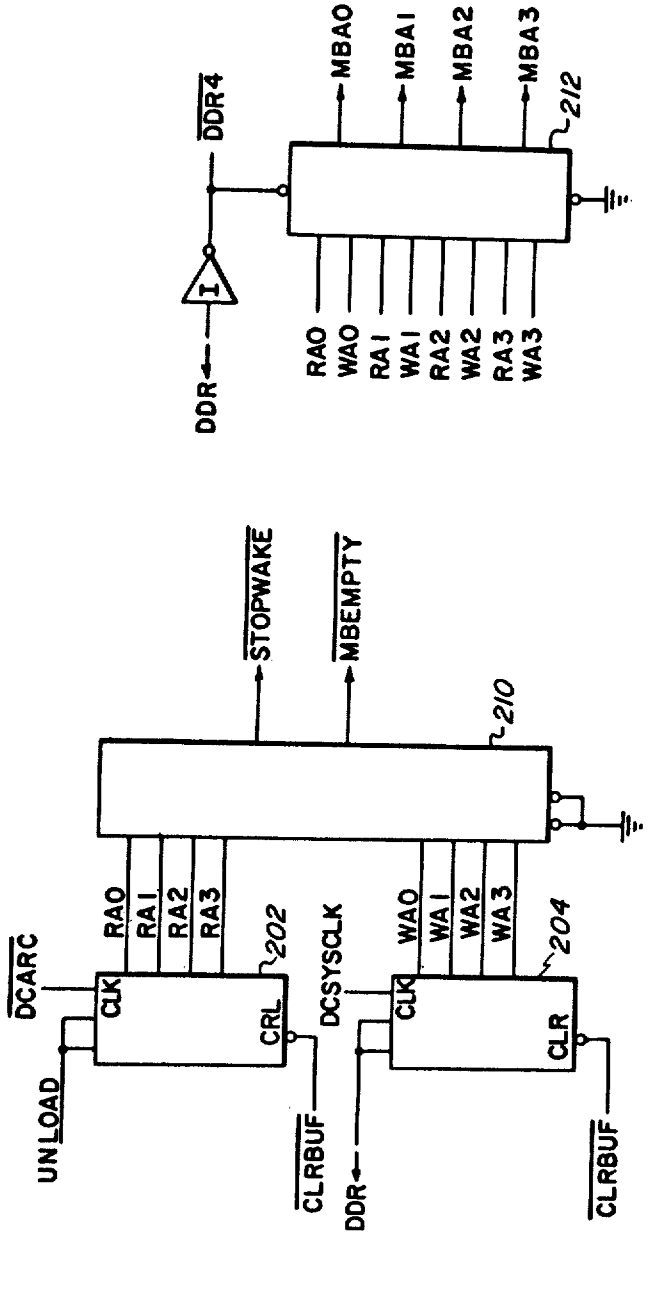
FIG. 9 is a schematic drawing of additional portions of the display controller as depicted in FIG. 6.

Referring to FIGS. 6 and 9, control over the data exchange for the buffers 180 and 184 is provided by the counters 202 and 204, whose outputs are received by a comparator 210 and a multiplexer 212. The signal UNLOAD increments the counter 202, while the counter 204 is incremented by DDR←. The output of the counters 202 and 204, i.e. RA bits and WA bits respectively, are compared by a comparator 210 to indicate whether or not the main buffer 180 is empty or full. The output signal $\overline{\text{STOPWAKE}}$ indicates that the main buffer 180 is almost full; whereas the signal $\overline{\text{MBEMPTY}}$ in fact indicates the buffer 180 is full. The comparator 110 is desirably implemented by a PROM, type MD 6300 by Microsystems International. The multiplexer 212, under control of the signal DDR←, selects whether the signals WA0–3 or RA0–3 are placed on the output lines MBA0–MBA3. It has already been mentioned that MBA0–MBA3 select the words from the bus 22 for storage in the buffer 180. Control logic 190 (FIG. 6) is responsive to the output from the comparator 210 to provide buffer control signals, including the signal UNLOAD.

Figure 10:
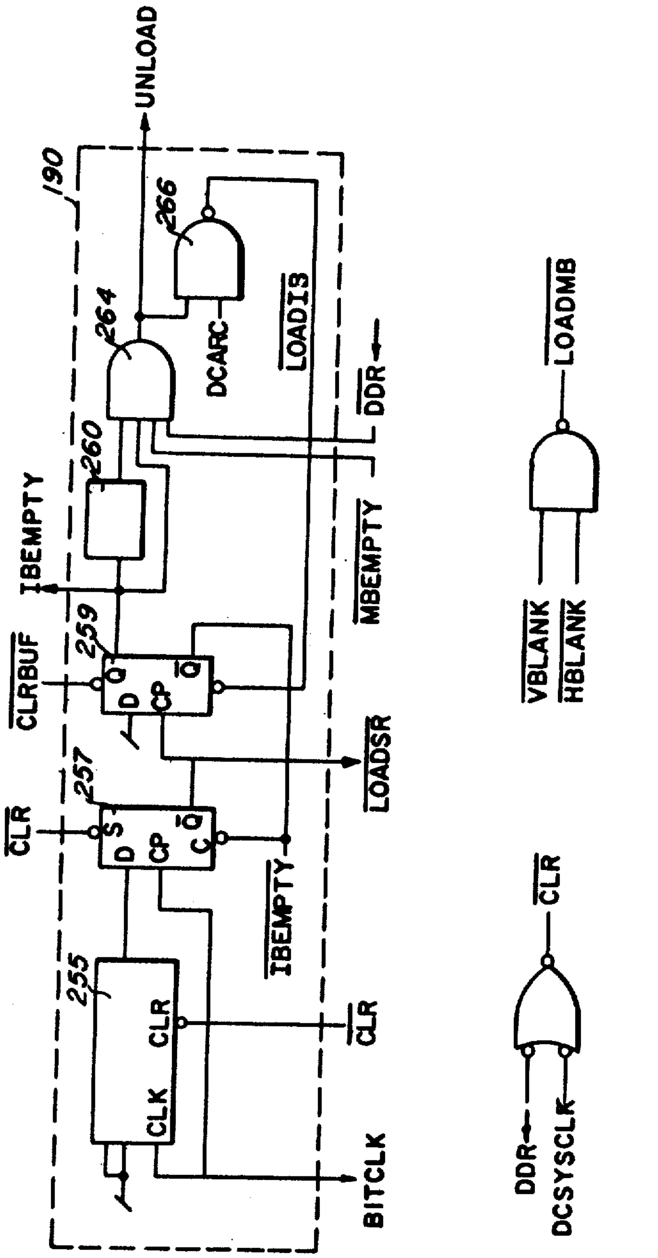
FIG. 10 is a schematic drawing of the control logic of the display controller as shown in FIG. 6.

As shown in FIG. 10, the control logic 190 is comprised of a counter 255 which is desirably of the type 9316 by Fairchild and which counts to 15. A D-C flip-flop 257, under control of $\overline{\text{IBEMPTY}}$ (intermediate buffer not empty) generates a load shift register signal $\overline{\text{LOADSR}}$. Another D-C flip-flop 259 is responsive to the output of the flip-flop 257 to provide the signal IBEMPTY (intermediate buffer empty) signal at is Q output and the $\overline{\text{IBEMPTY}}$ signal at its $\overline{Q}$ output. A latch 160 latches the Q output of the flip-flop 159 prior to "ANDing" with the signals IBEMTY unlatched, $\overline{\text{MBEMPTY}}$, and $\overline{\text{DDR}\leftarrow}$ by means of the NAND gate 264. The output of the NAND gate 264 provides the UNLOAD signal which causes transfer of data from the main buffer 180 to the intermediate buffer 184 upon the conditions defined by the input signals. The UNLOAD signal is also gated by the NAND gate 266 under control of a signal DCARC to provide an output signal which controls the state of the flip-flop 259. Further shown in FIG. 10 is the gating logic which provides the signals CLR and LOADMB.

Additional logic shown in Appendix A (See file of subject Application) provides for the various clocking and control signals required for the operation of the display controller $20_{(1)}$. Some of the more significant features of this logic is that the bit clock is disabled by vertical and horizontal blanking, and its rate can be set by the microcode to either 50 or 100 ns, by the function SETMODE (F2=11, specific to the display horizontal task DHT). This function examines the two high order bits of the processor bus 22. If bit 0=1, the bit clock rate is set to 100ns period (at the start of the next scan line), and a "1" is merged into the NEXT ADDRESS field. SETMODE also latches bit 1 of the processor bus 22 and uses the value to control the polarity of the video output. A third function, EVENFIELD (F2=10, specific to DHT and to the display vertical task DVT), merges a "1" into the NEXT ADDRESS field if the display $20_{(1)}$ is in the even field.

As indicated previously, the display controller $18_{(1)}$ generates wakeup-task request signals 1-3 to the microprocessor tasking logic. Task 3, the vertical task DVT, is awakened once per field, at the beginning of vertical retrace. Task 2, the display horizontal task DHT, is awakened once at the beginning of each field, and thereafter whenever the display word task DWT (task 1) blocks. DHT can block itself, in which case neither it nor DWT can be awakened until the start of the next field. The wakeup-task request signal 1 for the display word task DWT is controlled by the state of the main buffer 180. If DWT has not executed a BLOCK, if DWT is not blocked, and if the buffer 180 is not full, DWT wakeups are generated. The logic sets the buffer 180 empty and clears the DWT block flip-flop at the beginning of horizontal retrace for every scan line.

The specific constitution of the main memory 16 as shown in FIG. 4 will now be described in more detail with reference to FIGS. 4 and 5. As indicated above, the main memory 16 includes an addressable main memory store 17 which is desirably 64,000 words × 16 bits. The main memory 16 further includes a conventional driver and parity checking circuit 19 connected to the store 17 by a 16-bit memory data bus 21.

Figure 5:
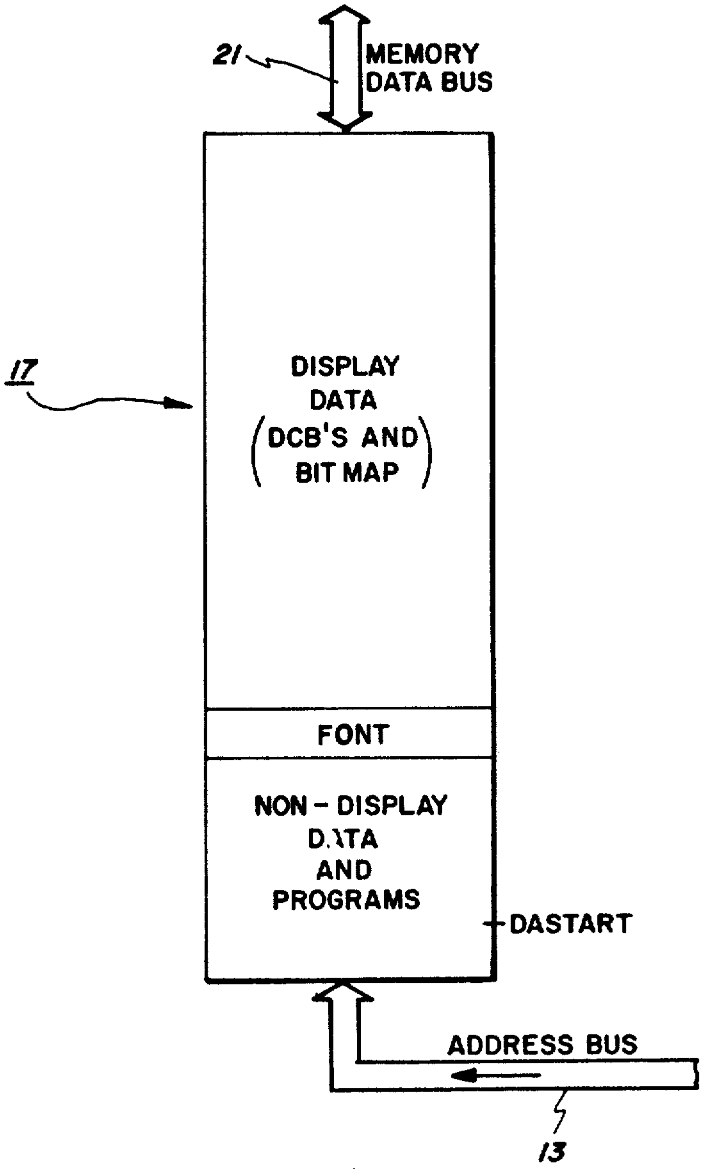
FIG. 5 is a representation of the different storage sections of the main memory store depicted in FIG. 4.

Referring to FIG. 5, the main memory store 17 is preferably divided into three main storage sections. The first section has various programs and non-display data stored therein. The word DASTART, which points to the first DCB as defined above, is located in this section.

The second section of main memory store 17 has alphanumeric character fonts stored therein. Each word in this section of the memory corresponds to a distinct scan line of a distinct character. For example, a character may require 12 scan lines on the display $20_{(1)}$. In this event, that character would be comprised of twelve, 16-bit words in the font section of main memory store 17. The bits in each of these 12 words that are binary "1" would define corresponding points to be illuminated on the display when the character is formed thereon. Under program control, the 12 word font definition of a character to be displayed would be transferred into a designated storage location in a third, display data section, of the main memory store 17 for display at a corresponding location on the display screen.

The third, display data section, has both the display control blocks (DCB's) and the "DCB map" to be displayed stored therein. AS indicated previously, each DCB contains the information necessary to define the contents of a variable number of scan lines defining a region on the display screen. The DCB contains this number, as well as the address in memory from which the data for the region described by the DCB is to be taken. The DCB also contains the address of another DCB whose contents will be used when the scan lines described by the first DCB have been displayed. There may thus by any number of DCB's, each with an associated region of memory to be displayed (i.e. segment of the bit map). As also indicated previously, each segment of bit map contains a number of words at least equal to the total number of displayed points in that segment divided by 16, i.e. the number of bits per word in the store 17. There are NWRDS words necessary to define a complete scan line on the display screen. Each DCB contains the value of NWRDS for the region it describes.

A memory reference to the main memory 16 is initiated by executing F1=6, MAR←. The program partially controls memory timing, and must observe certain rules to insure correct operation:

(a) There may be a minimum of one and maximum of three microinstructions executed between starting the memory and the data transfer.

(b) During the fourth cycle after the address from memory address register 114 has been loaded, if F2=6, a store of bus data into the word addressed by register 114 will occur.

(c) During the fourth cycle of a reference, if BS=5, the reference is a fetch to the word addressed by register 114.

(d) During the fifth cycle of a reference, if BS=5, the odd word of the double word addressed by register 114 is delivered. The memory cycle is extended by one cycle if both words of a doubleword are fetched. If MD is referenced during the fifth cycle, it must have also been referenced during the fourth.

(e) If MD is referenced before the fourth cycle of a reference, the processor will be suspended until a total of four cycles have elapsed.

(f) If RSELECT = 37B during the instruction which starts the memory, a refresh cycle is assumed and all memory cards are activated. This is used by the refresh task.

(g) The memory checks parity on all fetches, unless the cycle is a refresh cycle, or the address is ≧177000 in which case an I/O device is being referenced. Parity errors result in activation of a task whose purpose is to deal with the error.

The main memory store 17 is connected to the bus 22 through the memory data bus 21 and the drivers and parity device 19, the latter providing for the transfer of data to and from the store 17 with a parity check upon the fetching of data from the store 17.

Appendix B (See file of subject Application) hereto contains a description of exemplary microcode for implementing the data processing display system as described above which further includes as other I/O devices 20 a disk drive, a "MOUSE" cursor unit and five-finger keyset, an unencoded keyboard, an interfact to a serial communication line referred to as "Ethernet," and optionally a serial printer. The main microprogram is referred to as an "emulator." The microassembler (MU) for the CPU is preferably implemented in BCPL and is also described in Appendix B.

Although the invention has been described with respect to a presently preferred embodiment, it will be appreciated by those skilled in the art that various modifications, substitutions, etc. may be made without departing from the spirit and scope of the invention as defined in and by the following claims.

What is claimed is:

1. A data processing display system comprising:

a display device capable of displaying a desired image, said display device including a plurality of points each capable of being selectively illuminated;

a main memory storage device including a plurality of addressable storage locations capable of being addressed by predetermined address signals, each location capable of storing a multi-bit display word therein, at least some of said addressable storage locations including in the aggregate a number of display bits at least equal to said plurality of points of said display device whereby a display bit map of said desired image is capable of being stored and defined in said at least some addressable storage locations;

a display controller connected to said display device and responsive to predetermined instructions for controlling the illumination of said plurality of points of said display device;

a central processing unit including first means for generating said predetermined instructions for application to said display controller, and second means for generating said predetermined address signals for application to said main memory storage device;

an address bus connected between said main memory storage device and said central processing unit for supplying said predetermined address signals to said main memory storage device;

a main data transfer bus connected to said main memory storage device, said central processing unit and said display controller, said main data transfer bus capable of supplying to said display controller the display words addressed from said at least some addressable storage locations of said memory storage device and said predetermined instructions;

said central processing unit including a data section and a control section, said control section including said first means for generating and means for supplying instructions to said data section, and said data section including said second means for generating and means for executing instructions supplied it from said control section; and said display controller including third means for generating at least one display task request signal, said system further comprising means for supplying said at least one display task request signal to said control section, and said control section including means responsive to said at least one display task request signal for causing said means for supplying instructions to said data section to supply instructions relating to the display of said desired image by said display device.

2. The data processing display system of claim 1, wherein said display device is a raster-scanned device having a plurality of scan lines.

3. The data processing display system of claim 2, wherein the data to be displayed in said scan lines is transmitted from said main memory storage device along said main data transfer bus to said display controller in a plurality of fields of scan lines.

4. The data processing display system of claim 3, wherein at least some other of the addressable storage locations of said main memory storage device are capable of storing display control data therein.

5. The data processing display system of claim 4, wherein said central processing unit further includes means for examining display control data from said main memory storage device, and means responsive to said means for examining for directing said second for generating to address said at least some of said addressable storage locations sequentially or in increments of NWRDS, where NWRDS is the number of display words in a scan line.

6. The data processing display system of claim 1, wherein the display device includes a display screen utilizing a raster-scanning beam, and wherein said at least one display task request signal includes three display task request signals DWT, DVT and DHT, where DWT is generated when the display controller requires another display word from said main memory storage device, DVT is generated each time said scanning beam returns to the top scan line of said screen, and DHT is generated each time said scanning beam returns to the left side of said screen.

7. A data processing display system comprising:

a display device capable of displaying a desired image, said display device including a plurality of points each capable of being selectively illuminated;

a main memory storage device including a plurality of addressable storage locations capable of being addressed by predetermined address signals, each location capable of storing a multi-bit display word therein, at least some of said addressable storage locations including in the aggregate a number of display bits at least equal to said plurality of points of said display device whereby a display bit map of said desired image is capable of being stored and defined in said at least some addressable storage locations;

a display controller connected to said display device and responsive to predetermined instructions for controlling the illumination of said plurality of points of said display device;

a central processing unit including first means for generating said predetermined instructions for application to said display controller, and second means for generating said predetermined address signals for application to said main memory storage device;

an address bus connected between said main memory storage device and said central processing unit for supplying said predetermined address signals to said main memory storage device;

a main data transfer bus connected to said main memory storage device, said central processing unit and said display controller, said main data transfer bus capable of supplying to said display controller the display words addressed from said at least some addressable storage locations of said memory storage device and said predetermined instructions; and said central processing unit including a data section and a control section, said control section including said first means for generating and means for supplying instructions to said data section, and said data section including said second means for generating and means for executing instructions supplied it from said control section, said means for supplying instructions and said first means for generating including a microinstruction memory device, said instructions and said predetermined instructions being microinstructions.

* * * * *